(12) United States Patent
Wentink

(10) Patent No.: US 9,113,478 B2
(45) Date of Patent: Aug. 18, 2015

(54) METHODS AND APPARATUS FOR REQUESTING AND ALLOCATING RESOURCES IN MULTIPLE TRANSMISSION OPPORTUNITIES

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 1098 days.

(21) Appl. No.: 12/538,704

(22) Filed: Aug. 10, 2009

(65) Prior Publication Data

US 2010/0046454 A1 Feb. 25, 2010

Related U.S. Application Data

(60) Provisional application No. 61/090,389, filed on Aug. 20, 2008.

(51) Int. Cl.
*H04W 4/00* (2009.01)
*H04J 3/24* (2006.01)
*H04L 1/00* (2006.01)
*H04W 74/08* (2009.01)
*H04W 72/04* (2009.01)

(52) U.S. Cl.
CPC .......... *H04W 74/0816* (2013.01); *H04W 72/04* (2013.01)

(58) Field of Classification Search
USPC .............. 370/321, 230.1, 329, 254, 310, 389, 370/349, 338
See application file for complete search history.

(56) References Cited

U.S. PATENT DOCUMENTS

| 4,736,371 | A | 4/1988 | Tejima et al. |
| 5,515,379 | A | 5/1996 | Crisler et al. |
| 5,742,592 | A | 4/1998 | Scholefield et al. |
| 6,327,256 | B1 | 12/2001 | Paivike et al. |
| 6,370,153 | B1 | 4/2002 | Eng |
| 8,233,462 | B2 | 7/2012 | Walton et al. |
| 2003/0103500 | A1* | 6/2003 | Menon et al. ................. 370/389 |
| 2003/0223365 | A1* | 12/2003 | Kowalski ................... 370/230.1 |
| 2004/0258039 | A1* | 12/2004 | Stephens ....................... 370/349 |
| 2005/0243780 | A1* | 11/2005 | Trainin et al. ................. 370/338 |
| 2006/0140112 | A1* | 6/2006 | Ginzburg ....................... 370/229 |
| 2007/0133447 | A1* | 6/2007 | Wentink ........................ 370/310 |
| 2007/0165587 | A1 | 7/2007 | Choi |

(Continued)

FOREIGN PATENT DOCUMENTS

| GB | 2324686 A | 10/1998 |
| GB | 2325689 A | 12/1998 |

(Continued)

OTHER PUBLICATIONS

International Search Report and Written Opinion—PCT/US2009/053965—ISA/EPO—Dec. 4, 2009.

(Continued)

*Primary Examiner* — Kiet G Tang
(74) *Attorney, Agent, or Firm* — Eric Ho

(57) ABSTRACT

In accordance with a method for scheduling transmission opportunities (TXOPs) in a wireless communications system, a subscriber station may send a request-to-send multiple (RTSM) frame to an access point. The access point may allocate resources for multiple TXOPs based on the RTSM frame. The access point may send a clear-to-send multiple (CTSM) frame.

50 Claims, 9 Drawing Sheets

(56) References Cited

U.S. PATENT DOCUMENTS

| | | |
|---|---|---|
| 2008/0130519 A1* | 6/2008 | Bahl et al. .................. 370/254 |
| 2008/0144564 A1* | 6/2008 | Hamalianen et al. ........ 370/321 |
| 2008/0186913 A1* | 8/2008 | Ahn et al. .................... 370/329 |
| 2009/0010210 A1* | 1/2009 | Hiertz et al. ................. 370/329 |

FOREIGN PATENT DOCUMENTS

| | | |
|---|---|---|
| JP | 62157428 A | 7/1987 |
| TW | 200527868 | 8/2005 |
| WO | 2005109761 A1 | 11/2005 |
| WO | WO-2007082235 A1 | 7/2007 |

OTHER PUBLICATIONS

Chen, WT., et al., "An Efficient Flow Control and Medium Access in Multihop Ad Hoc Networks with Multi-Channels", 2007 IEEE 66th Vehicular Technology Conference (VTC-2007 fall), pp. 56-60, 2007.

Taiwan Search Report—TW098128082—TIPO—Jan. 28, 2013.

* cited by examiner

METHODS AND APPARATUS FOR REQUESTING AND ALLOCATING RESOURCES IN MULTIPLE TRANSMISSION OPPORTUNITIES

RELATED APPLICATIONS

This application claims the benefit of U.S. Provisional Patent Application Ser. No. 61/090,389 entitled "Systems and Methods for Requesting and Allocating Resources in Multiple Transmission Opportunities," which was filed on Aug. 20, 2008, which is expressly incorporated herein by this reference.

TECHNICAL FIELD

The present disclosure relates generally to wireless communication systems. More specifically, the present disclosure relates to systems and methods for requesting and allocating resources in multiple transmission opportunities (TXOPs).

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc.

A wireless communication system may provide communication for a number of cells, each of which may be serviced by a base station. A base station may be a fixed station that communicates with subscriber stations. A base station may alternatively be referred to as an access point or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

DETAILED DESCRIPTION

Figure 1:
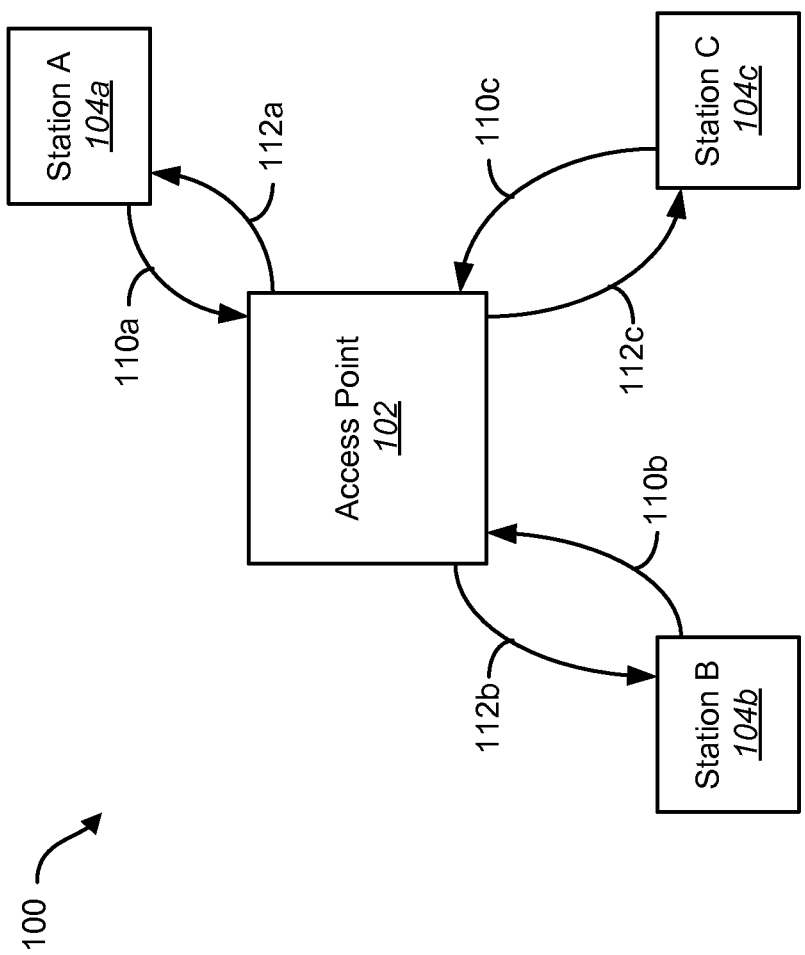
FIG. 1 illustrates a system including an access point in wireless electronic communication with multiple subscriber stations.

A method for scheduling transmission opportunities (TXOPs) in a wireless communications system is described. A request-to-send multiple (RTSM) frame may be received from a subscriber station. Resources for multiple TXOPs may be allocated according to the RTSM frame. A clear-to-send multiple (CTSM) frame may be sent. A TXOP start (TXS) frame may be sent. A TXOP may begin. The TXS frame may indicate how a subscriber station may transmit after the TXS frame. A clear-to-send multiple (CTSM) frame combined with a TXOP start (TXS) frame may be sent. The TXOP may be defined by a power save multi-poll (PSMP). The RTSM frame may include a total amount of time needed by the subscriber station to transmit its data at an expected transmission rate. The RTSM frame may include a total number of bytes needed by the station to transmit its data.

The RTSM frame may include a requested number of TXOPs. A TXOP start (TXS) frame may be sent, and the TXOP may begin without receiving an RTSM. The TXS frame may be retransmitted if the TXS frame collides with the RTSM frame. The CTSM frame may be a clear to send (CTS) frame. The RTSM frame may have a priority level. Allocating resources for multiple TXOPs according to the RTSM frame may include implementing a virtual enhanced distributed channel access (EDCA). Allocating resources for multiple TXOPs according to the RTSM frame may also include using a non-starving scheduler.

A method for scheduling transmission opportunities (TXOPs) in a wireless communications system by a subscriber station is described. A request-to-send multiple (RTSM) frame may be sent to an access point (AP). A clear-to-send multiple (CTSM) frame may be received. A TXOP start (TXS) frame may also be received. Data may be sent during a TXOP.

An access point (AP) configured to schedule transmission opportunities (TXOPs) in a wireless communications system is also described. The AP may include a processor. The AP may also include circuitry coupled to said processor. The circuitry may be configured to receive a request-to-send multiple (RTSM) frame from a subscriber station. The circuitry may also be configured to allocate resources for multiple TXOPs according to the RTSM frame. The access point may be configured to send a clear-to-send multiple (CTSM) frame. The access point may also be configured to send a TXOP start (TXS) frame. The access point may further be configured to begin a TXOP.

The access point may further be configured to send a clear-to-send multiple (CTSM) frame combined with a TXOP start (TXS) frame. The access point may be further configured to send a TXOP start (TXS) frame and begin the TXOP without receiving an RTSM frame. The access point may also be configured to retransmit the TXS frame if the TXS frame collides with the RTSM frame.

A subscriber station configured to schedule transmission opportunities (TXOPs) in a wireless communications system is also described. The subscriber station may include a processor. The subscriber station may also include circuitry coupled to said processor. The circuitry may be configured to send a request-to-send multiple (RTSM) frame to an access point (AP). The circuitry may also be configured to receive a clear-to-send multiple (CTSM) frame. The circuitry may be further configured to receive a TXOP start (TXS) frame. The subscriber station may send data during a TXOP.

An apparatus configured to schedule transmission opportunities (TXOPs) in a wireless communications system is described. The apparatus may include means for receiving a request-to-send multiple (RTSM) frame from a subscriber station. The apparatus may also include means for allocating resources for multiple TXOPs according to the RTSM frame.

An apparatus configured to schedule transmission opportunities (TXOPs) in a wireless communications system is described. The apparatus may include means for sending a request-to-send multiple (RTSM) frame to an access point (AP). The apparatus may also include means for receiving a clear-to-send multiple (CTSM) frame.

A computer-program product for scheduling transmission opportunities (TXOPs) in a wireless communications system is also described. The computer-program product may include a computer-readable medium having instructions thereon. The instructions may include code for receiving a request-to-send multiple (RTSM) frame from a subscriber station. The instructions may also include code for allocating resources for multiple TXOPs according to the RTSM frame.

A computer-program product for scheduling transmission opportunities (TXOPs) in a wireless communications system is described. The computer-program product may be a computer-readable medium having instructions thereon. The instructions may include code for sending a request-to-send multiple (RTSM) frame to an access point (AP). The instructions may also include code for receiving a clear-to-send multiple (CTSM) frame.

The Institute of Electronic and Electrical Engineers (IEEE) 802.11 Working Group aims to prepare formal standards for wireless local area network (WLAN) computer communication in the 2.4 GHz and 5 GHz public spectrum bands. The techniques disclosed herein may be implemented in devices that are configured in accordance with IEEE 802.11 standards.

FIG. 1 illustrates a system 100 including an access point 102 in wireless electronic communication with multiple subscriber stations 104. The access point 102 may be a base station. The subscriber stations 104 may be mobile stations such as mobile phones, wireless networking cards, etc.

The access point 102 may communicate electronically with each of the subscriber stations 104. For example, the access point 102 may send electronic communications to the subscriber stations 104 over a downlink transmission 112. Similarly, the subscriber stations 104 may send electronic communications to the access point 102 over an uplink transmission 110. The subscriber stations 104 may receive transmissions from the access point 102 that are not directed at the specific subscriber station 104. For example, the access point 102 may send a downlink transmission 110 to subscriber station A 104a that may also be received by subscriber station B 104b. Similarly, subscriber stations 104 may receive uplink transmissions 110 from other subscriber stations 104 that are not directed at the other subscriber stations 104. For example, subscriber station B 104b may send an uplink transmission 110b to the access point 102 that may also be received by subscriber station C 104c.

Multiple subscriber stations 104 may be in electronic communication with a single access point 102 at any given time. As such, the access point 102 may be designed to receive transmissions from more than one subscriber station 104 during the same time frame. Such communications may be referred to as parallel transmissions in the uplink direction 110. The subscriber stations 104 may communicate with the access point 102 using distributed channel access, which is typically based on a random timing to access the channel. One constraint of such communications is that the parallel transmissions in the uplink direction 110 must start at exactly the same time. The time period during which parallel transmission in the uplink direction 110 occurs may be referred to as the TXOP (Transmission Opportunity).

Figure 2:
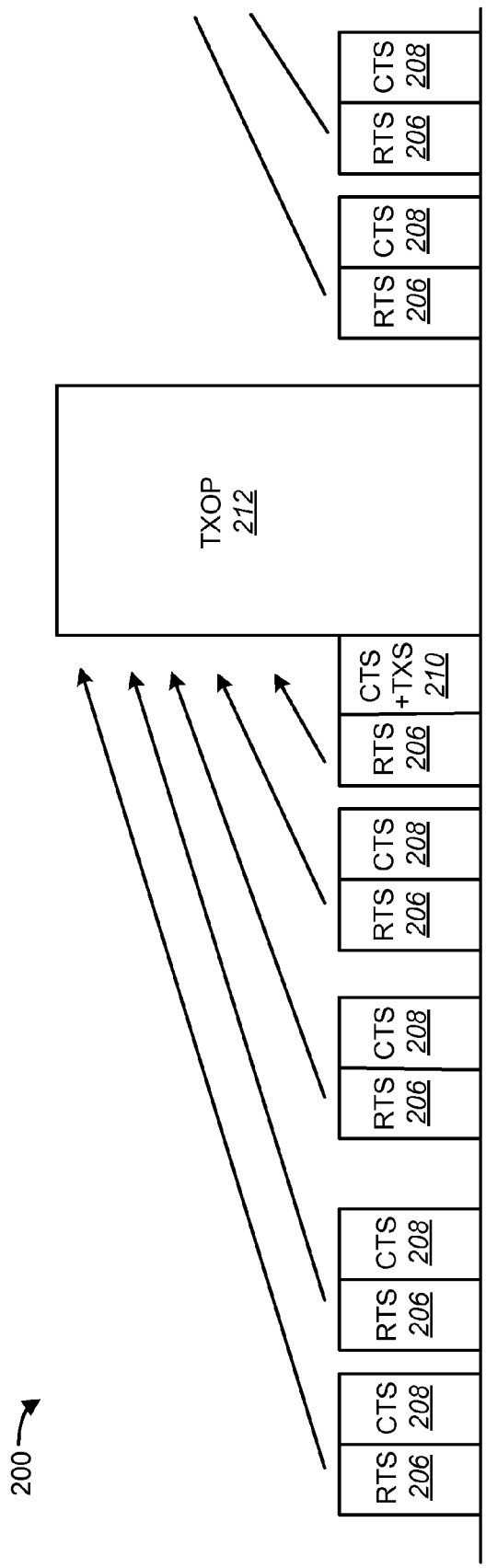
FIG. 2 illustrates a system for transmission schemes between an access point and multiple subscriber stations during a contention window and an uplink TXOP where reservations are made for each TXOP individually.

FIG. 2 illustrates a system 200 for transmission schemes between an access point 102 and multiple subscriber stations 104 during a contention window and an uplink TXOP 212 where the subscriber station 104 uses a request-to-send (RTS) to request access into the TXOP 212. Access point 102 provides feedback by sending a clear-to-send (CTS). The contention window 210 is a period of time during which uplink transmissions may occur and allocations can be made for the pending uplink TXOP 212 by sending an RTS. The TXOP 212 may have a pre-configured length.

The access point 102 may receive an RTS frame 206 from a subscriber station 104. The RTS frame 206 may request some or all of an upcoming TXOP 212. The amount of resources required in a TXOP 212 may be preconfigured or carried as part of the RTS frame 206. The access point 102 may send a CTS frame 208 to the subscriber station 104 to indicate that the requested resources of the TXOP 212 have been allocated to the subscriber station 104. The access point 102 may receive one or more RTS frames 206 for a single TXOP 212. The access point 102 may receive RTS frames 206 from multiple subscriber stations 104 for a particular TXOP 212. The access point 102 may also receive multiple RTS frames 206 from a single subscriber station 104 before a particular TXOP 212. The access point 102 may carry such duplicate requests over to a next TXOP 212. Alternatively, the access point 102 may discard the duplicate requests.

The access point 102 may send a TXOP start (TXS) frame 210 to indicate to the subscriber stations 104 that the TXOP 212 is beginning. The TXS frame 210 may be a separate frame. Alternatively, the TXS frame 210 may be sent as part of a CTS frame 208. The access point 102 may then begin the TXOP 212 window during which the access point 102 receives parallel transmissions in the uplink direction. Upon completion of the TXOP 212, another contention window may begin.

Figure 3:
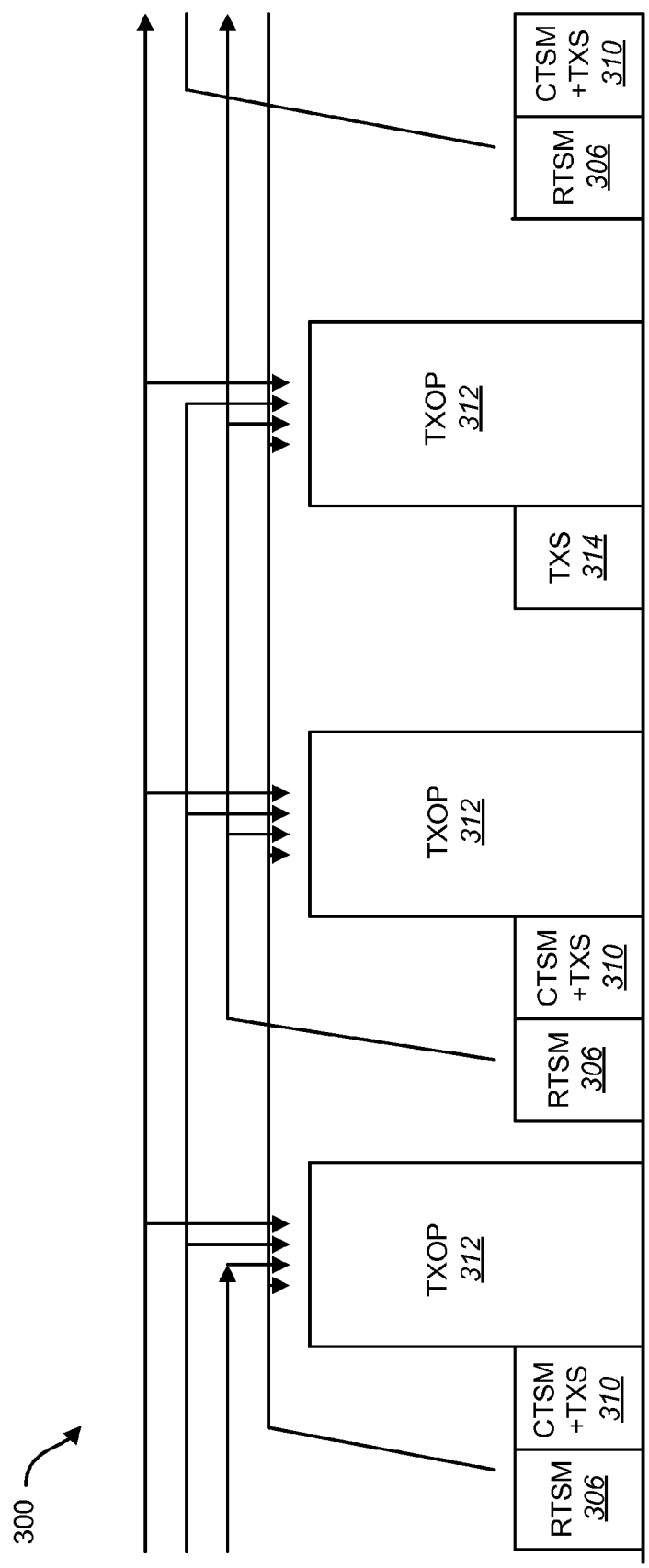
FIG. 3 illustrates a system for transmission schemes between an access point and multiple subscriber stations using request-to-send multiple (RTSM) frames and clear-to-send multiple (CTSM) frames.

FIG. 3 illustrates a system 300 for transmission schemes between an access point 102 and multiple subscriber stations 104 using request-to-send multiple (RTSM) frames 306 and clear-to-send multiple (CTSM) frames 310. Like the system 200 of FIG. 2, a contention window may occur during which allocations can be made for the pending uplink TXOP 312.

A subscriber station 104 may request access to multiple TXOPs 312. For example, a subscriber station 104 may request allocated resources for each of the upcoming three TXOPs 312. In the system 200 of FIG. 2, the subscriber station 104 would have to wait until each TXOP 212 has finished before requesting resources for the next TXOP 212. Furthermore, the subscriber station 104 would have to send an additional RTS frame 206 and the access point 102 would respond with an additional CTS frame 208 for each TXOP 212 requested by the subscriber station 104.

In the system 300 of FIG. 3, the subscriber station 104 may send an RTSM frame 306 instead of an RTS frame 206 to the access point 102. The RTSM frame 306 may be a message that includes requests for multiple TXOPs 312. The access point 102 may receive the RTSM frame 306, allocate the requested resources for multiple pending TXOPs 312, and return a CTSM frame 310 to the subscriber station 104 indicating that resources for multiple TXOPs 312 have been allocated to the subscriber station 104. The access point 102 may receive RTSM frames 306 from multiple subscriber stations 104 prior to starting a TXOP 312. Before starting the TXOP 312, the access point 102 may send a TXS frame 314 to the subscriber stations 104 to indicate that the TXOP 312 is starting. Alternatively, the access point 102 may send the TXS frame 314 as part of a CTSM frame 310. The TXS frame 314 may indicate how a subscriber station 104 is to transmit after the TXS frame 314.

If the access point 102 has not received an RTSM frame 306 before a pending TXOP 312, the access point 102 may send out a TXS 314 and start the TXOP 312. The TXOP 312 resources may already be allocated to subscriber stations 104 that have sent out previous RTSM frames 306.

It may be possible for the TXS frame 314 to collide with an incoming RTSM frame 306. If this happens, the access point 102 may simply retransmit the TXS frame 314. The sender of the RTSM frame 306 may have to wait until after the TXOP 312 to resend the RTSM frame 306. This assumes that the TXS frame 314 is transmitted at a higher priority than the RTSM frame 306. Similarly, the RTSM frame 306 may be transmitted at a priority level higher than other traffic and even at a higher priority level than the TXS frame 314.

The TXOP 312 may be defined by a power save multi-poll (PSMP). In a PSMP TXOP, the access point 102 may send a schedule to each of the subscriber stations 104 that permits the subscriber stations 104 to sleep during parts of the TXOP 312. Parts of the TXOP 312 may contain multiple uplink transmissions in parallel.

Figure 4:
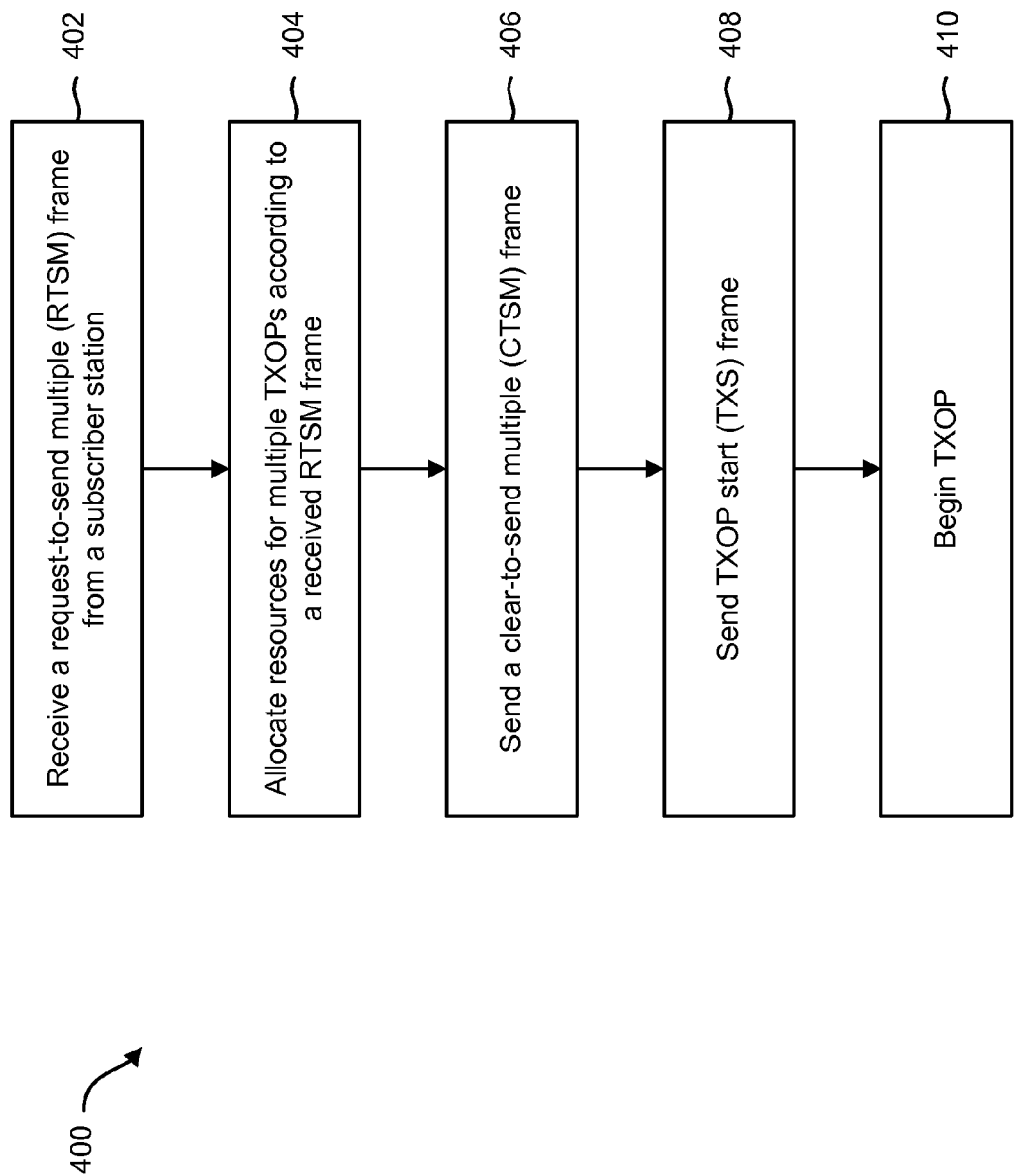
FIG. 4 is a flow diagram illustrating a method for allocating resources in multiple TXOPs to subscriber stations.

FIG. 4 is a flow diagram illustrating a method 400 for allocating resources in multiple TXOPs 312 to subscriber stations 104. The access point 102 may receive 402 a request-to-send multiple (RTSM) frame 306 from a subscriber station 104. The access point 102 may then allocate 404 resources for multiple TXOPs 312 according to the received RTSM frame 306. The access point 102 may send 406 a clear-to-send multiple (CTSM) frame 310. The CTSM frame 310 may include additional information from a clear-to-send (CTS) frame 208 concerning the scheduling of allocated resources. Alternatively, the CTSM frame 310 may include no additional information and may simply be a CTS frame 208. The access point 102 may send 408 a TXS 314 to indicate the start of a TXOP 312. The TXS 314 may be sent as part of the CTSM frame 310. Alternatively, the TXS 314 may be sent separate from the CTSM frame 310. The access point 102 may then begin 410 the TXOP 312.

Figure 5:
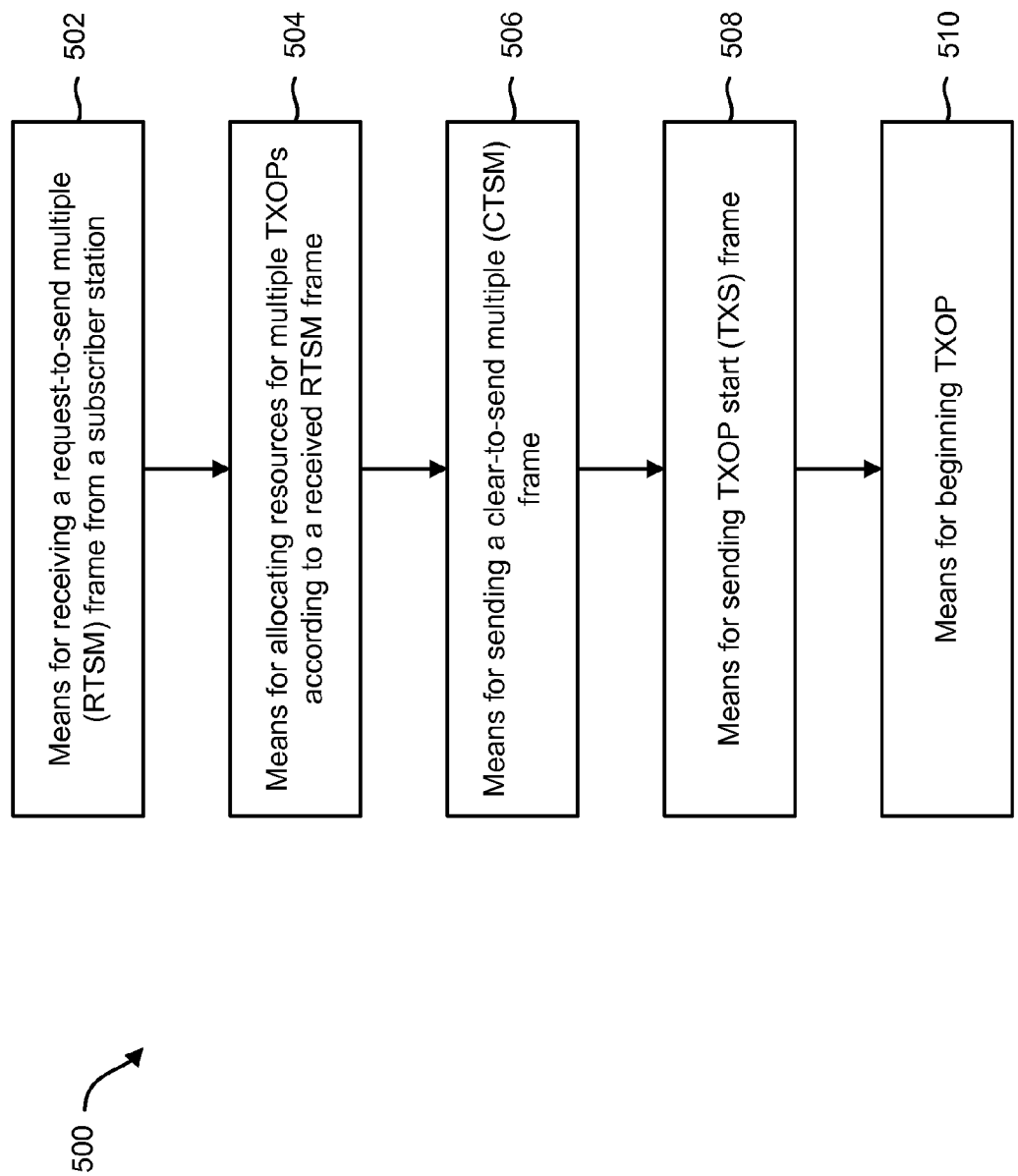
FIG. 5 illustrates means-plus-function blocks corresponding to the method of FIG. 4.

The method 400 of FIG. 4 described above may be performed by various hardware and/or software component(s) and/or module(s) corresponding to the means-plus-function blocks 500 illustrated in FIG. 5. In other words, blocks 402 through 410 illustrated in FIG. 4 correspond to means-plus-function blocks 502 through 510 illustrated in FIG. 5.

Figure 6:
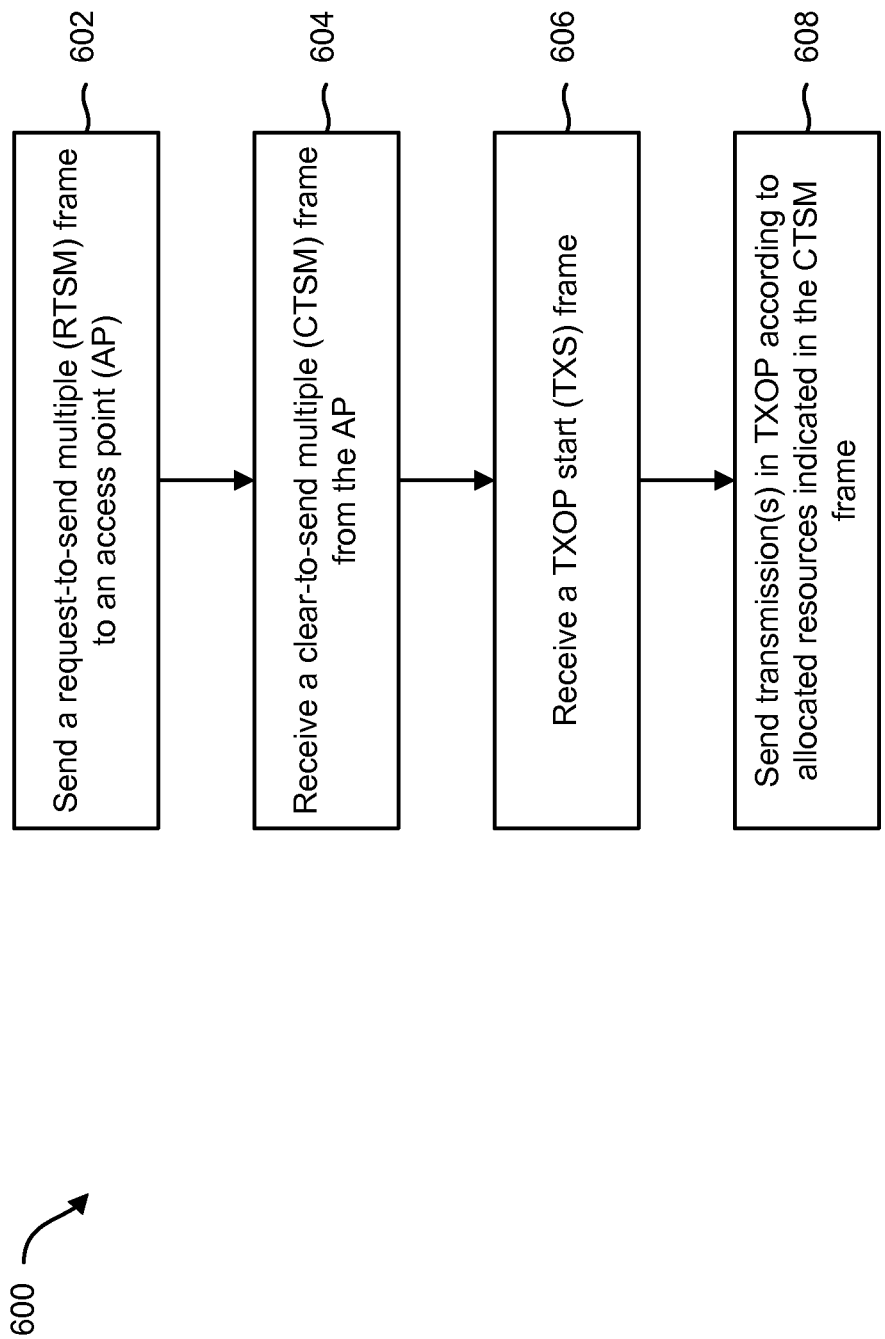
FIG. 6 is a flow diagram illustrating a method for requesting resources in multiple upcoming TXOPs.

FIG. 6 is a flow diagram illustrating a method 600 for requesting resources in multiple upcoming TXOPs 312. A subscriber station 104 may send 602 a request-to-send multiple (RTSM) frame 306 to an AP 102. The subscriber station 104 may then receive 604 a clear-to-send multiple (CTSM) frame 310 from the AP 102. Next, the subscriber station 104 may receive 606 one or more TXS frames 314 from the AP 102. As stated above in relation to FIG. 4, the TXS frame 314 may be received as part of the CTSM 310. The subscriber station 104 may then send 608 transmissions in the TXOP 312 according to the allocated resources that were indicated in the TXS frame 310.

Figure 7:
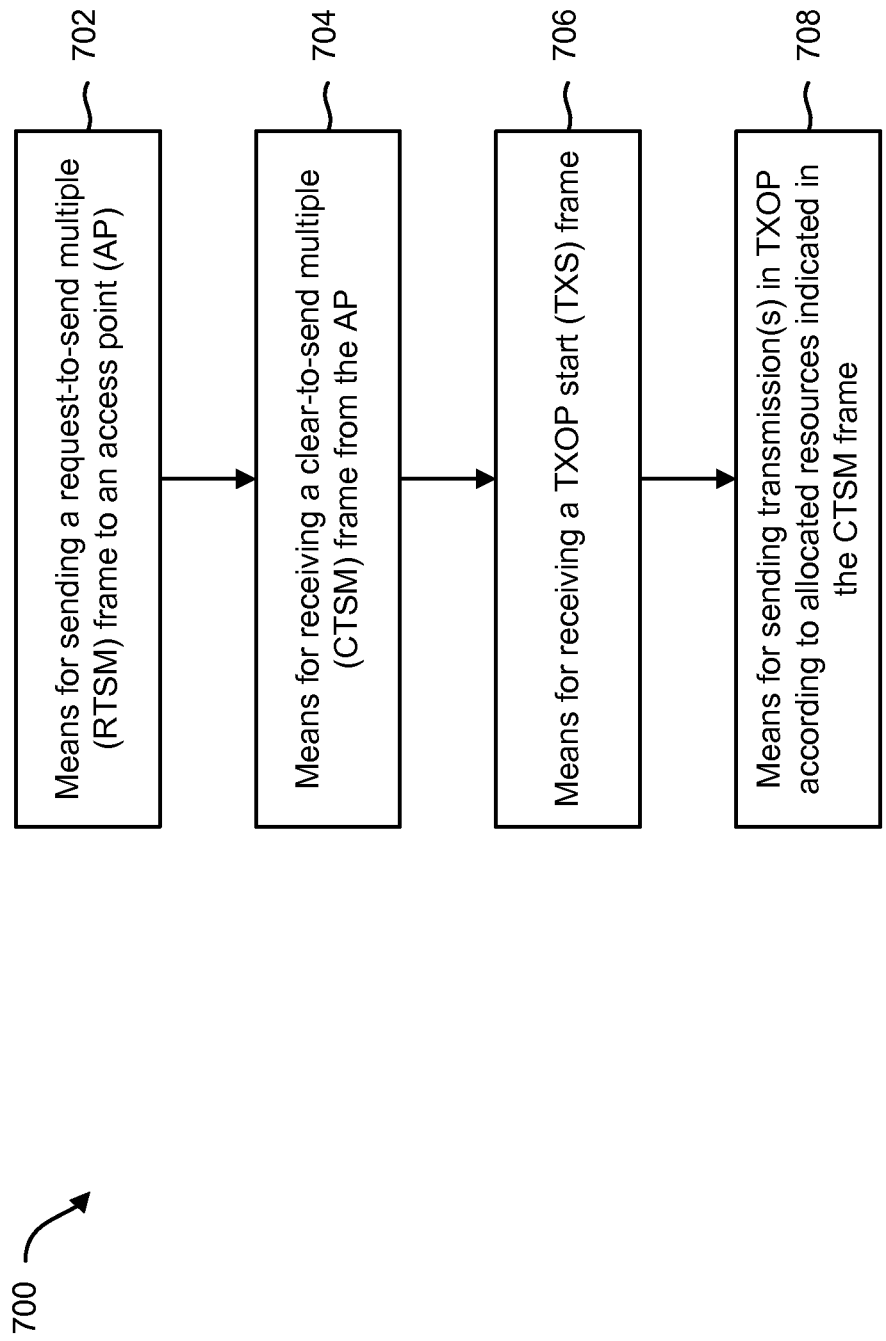
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 608 illustrated in FIG. 6 correspond to means-plus-function blocks 702 through 708 illustrated in FIG. 7.

Figure 8:
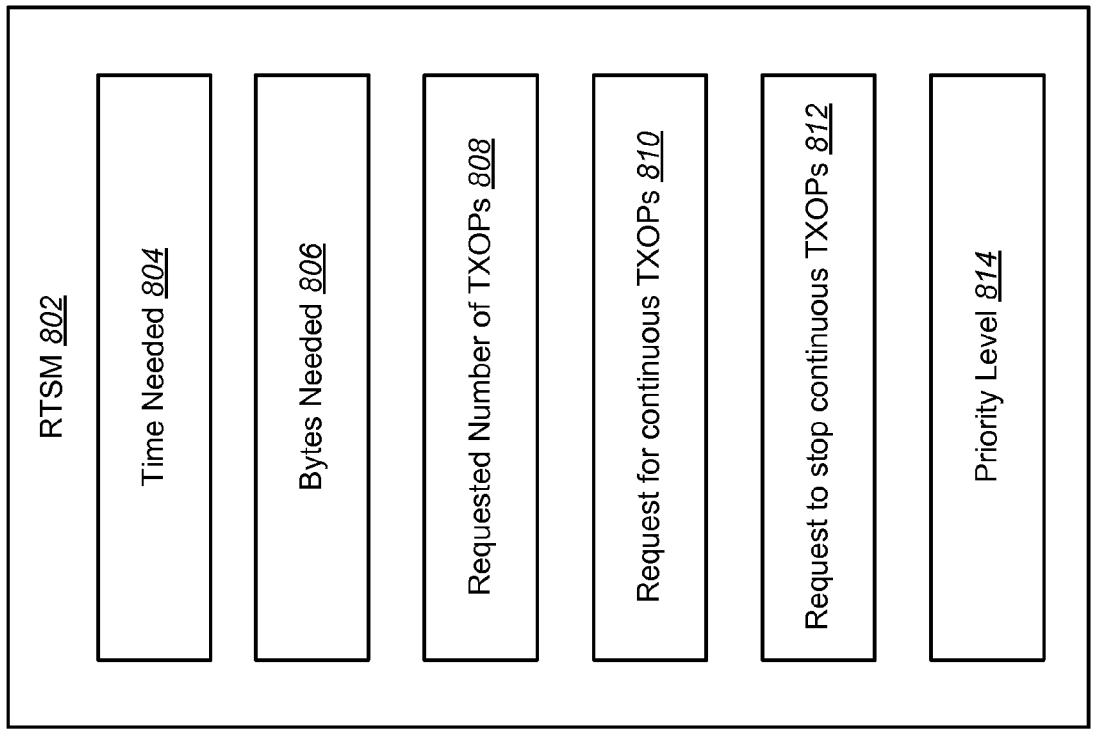
FIG. 8 is a block diagram illustrating the various components of an RTSM frame.

FIG. 8 is a block diagram illustrating the various components of an RTSM frame 802. The RTSM frame 802 may include the time needed 804 in the upcoming TXOPs 312, the bytes needed 806 in the upcoming TXOPs 312, the requested number 808 of TXOPs 312, and/or the priority level 814 of the RTSM. The RTSM frame 802 may further include a request 810 for continuous TXOPs, which requests that the AP 102 allocate resources for the subscriber station 104 in all upcoming TXOPs 312. The RTSM 802 may also include a request 812 to stop continuous TXOPs 312, which requests that the AP 102 stop allocating resources for the subscriber station 104 in all upcoming TXOPs 312. The requested resources may be based on data currently buffered at subscriber station 104, or based on data expected to be buffered in the near future at subscriber station 104. The requested resources may be determined by the MAC without explicit signaling from protocol layers above the MAC (i.e. from an application).

When the AP 102 receives more requests than it has resources available in an upcoming TXOP 312, the AP 102 may use a scheduler to determine which subscriber stations 104 are assigned resources during the TXOP 312 and which are not. Examples of schedulers are a round robin scheduler or virtual enhanced distributed channel access (EDCA). The virtual EDCA simulates the behavior of EDCA and assigns resources accordingly. The use of a virtual EDCA scheduler has the advantage that the relative prioritization of TXOP time to the various subscriber stations 104 is the same as when the subscriber stations 104 were contending for medium access individually, using EDCA.

Figure 9:
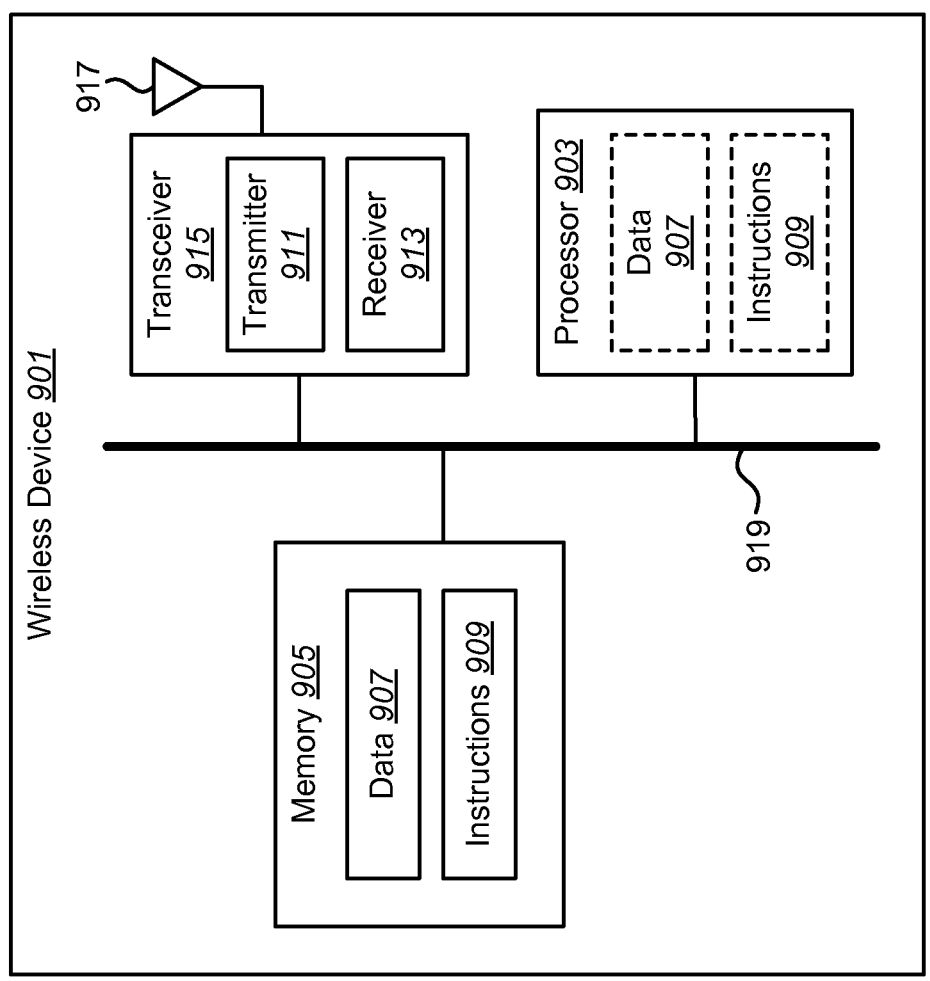
FIG. 9 illustrates various components that may be utilized in a wireless device.

FIG. 9 illustrates certain components that may be included within a wireless device 901. The wireless device 901 may be a mobile station or a base station.

The wireless device 901 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless device 901 of FIG. 9, in an alternative configuration, a combination of processors (e.g., an ARM and DSP) could be used.

The wireless device 901 also includes memory 905. The memory 905 may be any electronic component capable of storing electronic information. The memory 905 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 907 and instructions 909 may be stored in the memory 905. The instructions 909 may be executable by the processor 903 to implement the methods disclosed herein. Executing the instructions 909 may involve the use of the data 907 that is stored in the memory 905.

The wireless device 901 may also include a transmitter 911 and a receiver 913 to allow transmission and reception of signals between the wireless device 901 and a remote location. The transmitter 911 and receiver 913 may be collectively referred to as a transceiver 915. An antenna 917 may be electrically coupled to the transceiver 915. The wireless device 901 may also include (not shown) multiple transmitters, multiple receivers, multiple transceivers and/or multiple antenna.

The various components of the wireless device 901 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for scheduling transmission opportunities (TXOPs) in a wireless communications system, the method comprising:
receiving a request-to-send multiple (RTSM) frame from a subscriber station, wherein the RTSM frame comprises a request for multiple TXOPs that occur at different points in time;
allocating resources for the multiple TXOPs based on the RTSM frame; and
sending a TXOP start (TXS) frame, wherein the TXS frame indicates how the subscriber station may transmit after the TXS frame.

2. The method of claim 1, further comprising sending a clear-to-send multiple (CTSM) frame.

3. The method of claim 1, further comprising beginning a TXOP.

4. The method of claim 1, further comprising sending a clear-to-send multiple (CTSM) frame combined with the TXOP start (TXS) frame.

5. The method of claim 1, wherein the TXOP is defined by a power save multi-poll (PSMP).

6. The method of claim 1, wherein the RTSM frame includes a total amount of time needed by the subscriber station to transmit its data at an expected transmission rate.

7. The method of claim 1, wherein the RTSM frame includes a total number of bytes needed by the subscriber station to transmit its data.

8. The method of claim 1, wherein the RTSM frame includes a requested number of TXOPs.

9. The method of claim 1, further comprising beginning the TXOP without receiving the RTSM frame.

10. The method of claim 1, further comprising retransmitting the TXS frame if the TXS frame collides with the RTSM frame.

11. The method of claim 2, wherein the CTSM frame is a clear to send (CTS) frame.

12. The method of claim 1, wherein the RTSM frame has a priority level.

13. The method of claim 1, wherein allocating resources for the multiple TXOPs based on the RTSM frame(s) further comprises implementing a virtual enhanced distributed channel access (EDCA).

14. The method of claim 1, wherein allocating resources for the multiple TXOPs based on the RTSM frame(s) further comprises using a non-starving scheduler.

15. A method for scheduling transmission opportunities (TXOPs) in a wireless communications system by a subscriber station, the method comprising:
sending a request-to-send multiple (RTSM) frame to an access point (AP), wherein the RTSM frame comprises a request for multiple TXOPs that occur at different points in time;
receiving a clear-to-send multiple (CTSM) frame; and
receiving a TXOP start (TXS) frame, wherein the TXS frame indicates how the subscriber station may transmit after the TXS frame.

16. The method of claim 15, further comprising sending data during a TXOP that started after receiving a TXOP start (TXS) frame.

17. The method of claim 15, wherein the CTSM is combined with the TXOP start (TXS) frame.

18. The method of claim 15, wherein the TXOP is defined by a power save multi-poll (PSMP).

19. The method of claim 15, wherein the RTSM frame includes a total amount of time needed by the subscriber station to transmit its data at an expected transmission rate.

20. The method of claim 15, wherein the RTSM frame includes a total number of bytes needed by the subscriber station to transmit its data.

21. The method of claim 15, wherein the RTSM frame includes a requested number of TXOPs.

22. The method of claim 15, wherein the CTSM frame is a clear to send (CTS) frame.

23. The method of claim 15, wherein the RTSM frame has a priority level.

24. An access point (AP) configured to schedule transmission opportunities (TXOPs) in a wireless communications system, comprising:
a processor; and
circuitry coupled to said processor configured to:
receive a request-to-send multiple (RTSM) frame from a subscriber station, wherein the RTSM frame comprises a request for multiple TXOPs that occur at different points in time;
allocate resources for the multiple TXOPs based on the RTSM frame; and
send a TXOP start (TXS) frame, wherein the TXS frame indicates how the subscriber station may transmit after the TXS frame.

25. The access point of claim 24, wherein the access point is further configured to send a clear-to-send multiple (CTSM) frame.

26. The access point of claim 24, wherein the access point is further configured to begin a TXOP.

27. The access point of claim 24, wherein the access point is further configured to send a clear-to-send multiple (CTSM) frame combined with the TXOP start (TXS) frame.

28. The access point of claim 24, wherein the TXOP is defined by a power save multi-poll (PSMP).

29. The access point of claim 24, wherein the RTSM frame includes a total amount of time needed by the subscriber station to transmit its data at an expected transmission rate.

30. The access point of claim 24, wherein the RTSM frame includes a total number of bytes needed by the subscriber station to transmit its data.

31. The access point of claim 24, wherein the RTSM frame includes a requested number of TXOPs.

32. The access point of claim 24, wherein the access point is further configured to begin the TXOP without receiving the RTSM frame.

33. The access point of claim 24, wherein the access point is further configured to retransmit the TXS frame if the TXS frame collides with the RTSM frame.

34. The access point of claim 25, wherein the CTSM frame is a clear to send (CTS) frame.

35. The access point of claim 24, wherein the RTSM frame has a priority level.

36. The access point of claim 24, wherein allocating resources for the multiple TXOPs based on the RTSM frame(s) further comprises implementing a virtual enhanced distributed channel access (EDCA).

37. The access point of claim 24, wherein allocating resources for the multiple TXOPs based on the RTSM frame(s) further comprises using a non-starving scheduler.

38. A subscriber station configured to schedule transmission opportunities (TXOPs) in a wireless communications system, comprising:
a processor; and circuitry coupled to said processor configured to:
  send a request-to-send multiple (RTSM) frame to an access point (AP), wherein the RTSM frame comprises a request for multiple TXOPs that occur at different points in time;
  receive a clear-to-send multiple (CTSM) frame; and
  receive a TXOP start (TXS) frame, wherein the TXS frame indicates how the subscriber station may transmit after the TXS frame.

39. The subscriber station of claim 38, wherein the subscriber station is further configured to send data during a TXOP that started after receiving the TXOP start (TXS) frame.

40. The subscriber station of claim 38, wherein the CTSM frame is combined with the TXOP start (TXS) frame.

41. The subscriber station of claim 38, wherein the TXOP is defined by a power save multi-poll (PSMP).

42. The subscriber station of claim 38, wherein the RTSM frame includes a total amount of time needed by the subscriber station to transmit its data at an expected transmission rate.

43. The subscriber station of claim 38, wherein the RTSM frame includes a total number of bytes needed by the subscriber station to transmit its data.

44. The subscriber station of claim 38, wherein the RTSM frame includes a requested number of TXOPs.

45. The subscriber station of claim 38, wherein the CTSM frame is a clear to send (CTS) frame.

46. The subscriber station of claim 38, wherein the RTSM frame has a priority level.

47. An apparatus configured to schedule transmission opportunities (TXOPs) in a wireless communications system, comprising:
  means for receiving a request-to-send multiple (RTSM) frame from a subscriber station, wherein the RTSM frame comprises a request for multiple TXOPs that occur at different points in time;
  means for allocating resources for the multiple TXOPs based on the RTSM frame; and
  means for sending a TXOP start (TXS) frame, wherein the TXS frame indicates how the subscriber station may transmit after the TXS frame.

48. An apparatus configured to schedule transmission opportunities (TXOPs) in a wireless communications system, comprising:
  means for sending a request-to-send multiple (RTSM) frame to an access point (AP), wherein the RTSM frame comprises a request for multiple TXOPs that occur at different points in time;
  means for receiving a clear-to-send multiple (CTSM) frame; and
  means for receiving a TXOP start (TXS) frame, wherein the TXS frame indicates how the apparatus may transmit after the TXS frame.

49. A computer-program product for scheduling transmission opportunities (TXOPs) in a wireless communications system, the computer-program product comprising a non-transitory computer-readable medium having instructions thereon, the instructions comprising:
  code for receiving a request-to-send multiple (RTSM) frame from a subscriber station, wherein the RTSM frame comprises a request for multiple TXOPs that occur at different points in time;
  code for allocating resources for the multiple TXOPs based on the RTSM frame; and
  code for sending a TXOP start (TXS) frame, wherein the TXS frame indicates how the subscriber station may transmit after the TXS frame.

50. A computer-program product for scheduling transmission opportunities (TXOPs) in a wireless communications system, the computer-program product comprising a non-transitory computer-readable medium having instructions thereon, the instructions comprising:
  code for sending a request-to-send multiple (RTSM) frame to an access point (AP), wherein the RTSM frame comprises a request for multiple TXOPs that occur at different points in time;
  code for receiving a clear-to-send multiple (CTSM) frame; and
  code for receiving a TXOP start (TXS) frame, wherein the TXS frame indicates how a subscriber station may transmit after the TXS frame.

* * * * *